United States Patent
Daute et al.

(10) Patent No.: US 11,135,830 B2
(45) Date of Patent: Oct. 5, 2021

(54) SINTERABLE FEEDSTOCK FOR USE IN 3D PRINTING DEVICES

(71) Applicant: Emery Oleochemicals GmbH, Düsseldorf (DE)

(72) Inventors: Peter Daute, Beverstedt (DE); Manfred Jaeckel, Loxstedt (DE); Juergen Waldmann, Langenfeld (DE)

(73) Assignee: Emery Oleochemicals GmbH, Düsseldorf (DE)

( * ) Notice: Subject to any disclaimer, the term of this patent is extended or adjusted under 35 U.S.C. 154(b) by 0 days.

(21) Appl. No.: 16/923,165

(22) Filed: Jul. 8, 2020

(65) Prior Publication Data

US 2020/0369019 A1 Nov. 26, 2020

Related U.S. Application Data

(62) Division of application No. 15/322,865, filed as application No. PCT/EP2014/064646 on Jul. 8, 2014, now Pat. No. 10,737,480.

(51) Int. Cl.
*B33Y 70/00* (2020.01)
*B22F 3/00* (2021.01)
(Continued)

(52) U.S. Cl.
CPC ............... *B33Y 70/00* (2014.12); *B22F 3/16* (2013.01); *B22F 10/10* (2021.01); *B28B 1/001* (2013.01); *B33Y 10/00* (2014.12); *D01F 1/10* (2013.01)

(58) Field of Classification Search
None
See application file for complete search history.

(56) References Cited

U.S. PATENT DOCUMENTS

| | | |
|---|---|---|
| 4,095,403 A | 6/1978 | Beraud et al. |
| 5,738,817 A | 4/1998 | Danforth et al. |

(Continued)

FOREIGN PATENT DOCUMENTS

| | | |
|---|---|---|
| EP | 3167101 A1 | 5/2017 |
| JP | H11189912 A | 7/1999 |

(Continued)

OTHER PUBLICATIONS

Agarwala et al. "Filament Fed Materisl for Fused Deposition Processing of Ceramics and Metals," Proceedings of the Solid Freeform Fabrication Symposium, copyright Aug. 1996, vol. 712, pp. 451-458 (8 pages).

(Continued)

*Primary Examiner* — Anthony M Liang
(74) *Attorney, Agent, or Firm* — Taylor English Duma LLP; Philip P. McCann

(57) ABSTRACT

The present invention relates to a filament suitable to be used in a 3D printing device, wherein the filament comprises a metal and/or ceramic powder, a thermoplastic binder and additives. The invention also relates to a process for producing a shaped body comprising the step of printing a shaped green body using the filament according to the invention. Also provided is the use of a filament according to the invention in a 3D printing device and a green body producible by mixing a metal and/or ceramic powder and a thermoplastic binder. The invention also relates to the use of a binder of the invention for the production of a filament for 3D printing devices.

14 Claims, 2 Drawing Sheets

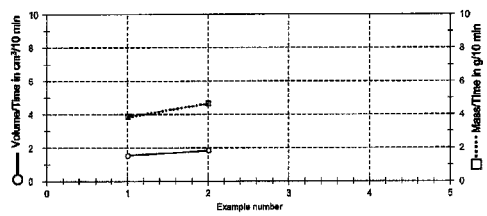

(51) Int. Cl.
*D01F 1/10* (2006.01)
*B28B 1/00* (2006.01)
*B33Y 10/00* (2015.01)
*B22F 3/16* (2006.01)
*B22F 10/10* (2021.01)

(56) References Cited

U.S. PATENT DOCUMENTS

| | | |
|---|---|---|
| 7,071,343 B2 | 7/2006 | Daute et al. |
| 7,488,838 B2 | 2/2009 | Daute et al. |
| 8,168,571 B2 | 5/2012 | Field et al. |
| 8,796,355 B2 | 8/2014 | Daute |
| 8,901,221 B2 | 12/2014 | Daute |
| 9,096,738 B2 | 8/2015 | Daute |
| 2002/0130434 A1 | 9/2002 | Rigali et al. |
| 2008/0051303 A1 | 2/2008 | Brand et al. |
| 2010/0168255 A1 | 7/2010 | Westfechtel et al. |
| 2010/0294501 A1 | 11/2010 | Daute et al. |
| 2010/0300694 A1 | 12/2010 | Vonderhagen et al. |
| 2011/0124785 A1 | 5/2011 | Daute et al. |
| 2011/0237770 A1 | 9/2011 | Daute et al. |
| 2013/0209600 A1* | 8/2013 | Tow ............... B33Y 30/00 425/375 |
| 2013/0310478 A1 | 11/2013 | Daute et al. |
| 2015/0038626 A1 | 2/2015 | Daute et al. |
| 2015/0232669 A1 | 8/2015 | Daute et al. |
| 2016/0297103 A1 | 10/2016 | Lee |
| 2017/0144222 A1 | 5/2017 | Daute et al. |

FOREIGN PATENT DOCUMENTS

| | | |
|---|---|---|
| JP | 2000355832 A | 12/2000 |
| JP | 2017528593 A | 9/2017 |
| KR | 101394119 B1 | 5/2014 |

OTHER PUBLICATIONS

International Search Report dated Mar. 5, 2015 in PCT/EP2014/064646 (5 pages).
Written Opinion dated Mar. 5, 2015 in PCT/EP2014/064646 (5 pages).
Wypych, "Plasticizer Types," Handbook of Plasticizers, ChemTec Publishing, 2004, pp. 44, 56.

* cited by examiner

Figure 1

Filament aluminum Oxide

| | | | |
|---|---|---|---|
| Test Standard: | ISO 1133 | Material: | Feedstock Al-Oxid 14-04 |
| Testing device: | MFlow | Fill capacity: | 10.000g |
| | | Temperature: | 20°C (RT) |

Set temperature : 130.0°C
Test load : 3.80 kg
Position/Test time until measuring start : 50 mm
Amount of periods : 3
Measuring length/time $\Delta s/\Delta t$ : 5 mm Test results:

| No. | Index | Section | $MFR_n$ g/10min | $\overline{MFR}$ g/10min | $MVR_n$ cm³/10 min | $\overline{MVR}$ cm³/10 min | $\rho_n$ g/cm³ | Total mass g |
|---|---|---|---|---|---|---|---|---|
| 1 | 1 | 1 | 3.06 | 3.87 | 1.21 | 1.53 | 2.53 | 2.706 |
| | 2 | 2 | 3.82 | | 1.51 | | 2.53 | |
| | 3 | 3 | 4.74 | | 1.87 | | 2.53 | |
| 2 | 1 | 1 | 3.74 | 4.65 | 1.48 | 1.84 | 2.52 | 2.693 |
| | 2 | 2 | 4.59 | | 1.82 | | 2.52 | |
| | 3 | 3 | 5.60 | | 2.22 | | 2.52 | |

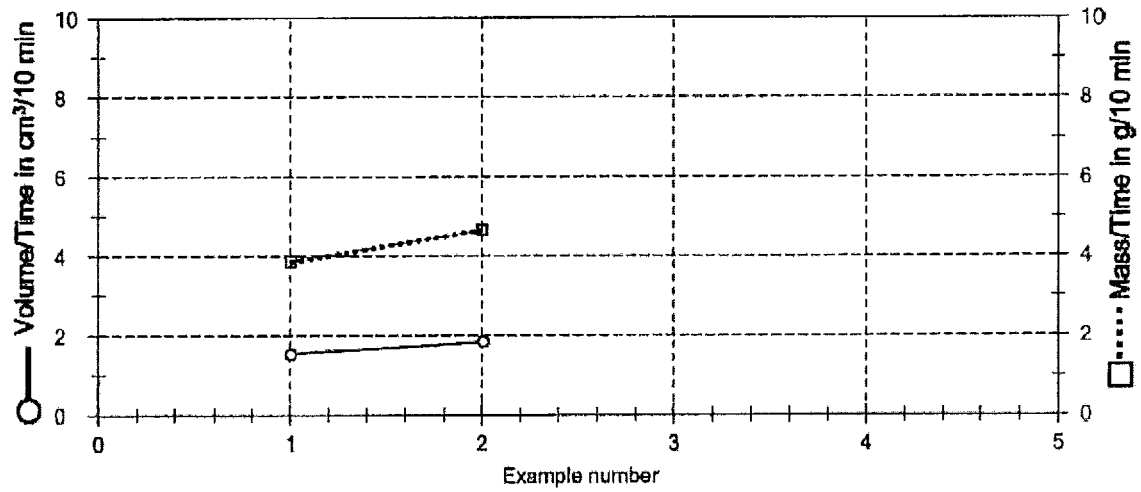

Figure 2

Filament stainless steel

| | | | | |
|---|---|---|---|---|
| Test Standard: | ISO 133 | | Material: | Feedstock Edelstahl 14-03 |
| Testing device: | MFlow | | Fill capacity: | 20.000g |
| | | | Temperature: | 20°C (RT) |

Set temperature : 130.0°C
Test load : 3.80 kg
Position/Test time until measuring start : 50 mm
Amount of periods : 3
Measuring length/time Δs/Δt : 5 mm Test results:

| No. | Index | Section | $MFR_n$ g/10min | $\overline{MFR}$ g/10min | $MVR_n$ cm³/10 min | $\overline{MVR}$ cm³/10 min | $\rho_n$ g/cm³ | Total mass g |
|---|---|---|---|---|---|---|---|---|
| 1 | 1 | 1 | 58.29 | 60.12 | 12.35 | 12.74 | 4.72 | 5.039 |
|   | 2 | 2 | 61.05 |       | 12.93 |       | 4.72 |       |
|   | 3 | 3 | 61.01 |       | 12.92 |       | 4.72 |       |
| 2 | 1 | 1 | 52.82 | 62.35 | 11.22 | 13.25 | 4.71 | 5.024 |
|   | 2 | 2 | 65.27 |       | 13.87 |       | 4.71 |       |
|   | 3 | 3 | 68.97 |       | 14.66 |       | 4.71 |       |

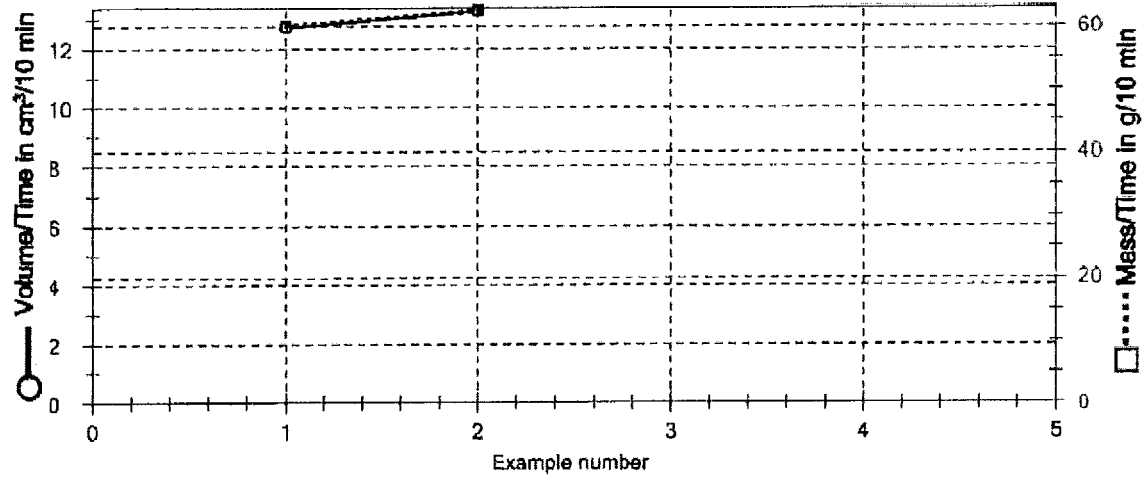

SINTERABLE FEEDSTOCK FOR USE IN 3D PRINTING DEVICES

This application is a divisional application of U.S. application Ser. No. 15/322,865 filed Dec. 29, 2016, currently pending, which claims the benefit of International Application No. PCT/EP2014/064646 filed on Jul. 8, 2014, the disclosures of which are expressly incorporated herein by reference.

FIELD

The present invention relates to a filament suitable to be used in a 3D printing device, wherein the filament comprises a metal and/or ceramic powder, a thermoplastic binder and additives. The invention also relates to a process for producing a shaped body comprising the step of printing a shaped green body using the filament according to the invention. Also provided is the use of a filament according to the invention in a 3D printing device and a green body producible by mixing a metal and/or ceramic powder and a thermoplastic binder. The invention also relates to the use of a binder of the invention for the production of a filament for 3D printing devices.

BACKGROUND

In the late 1980s powder injection molding processes including metal injection molding (MIM) and ceramic injection molding (CIM) were established. In these processes finely-powdered metal or ceramic material is mixed with a measured amount of binder material to form a 'feedstock' capable of being handled by plastic processing equipment through a process known as injection mold forming. The molding process allows complex parts to be shaped in a single operation and in high volume. The final products of such processes are commonly component items used in various industries and applications.

In these processes the molding step involves the use of injection molding machines and results in the formation of a so-called green body. This green body undergoes a further step in which the binder is typically at least partially removed before the body is heated to temperatures where the metal or ceramic components are sintered.

A feedstock is required also for more modem processes for forming prototypes such as 3D printers. In some aspects however the feedstock for 3D printing devices has been found to require different properties as will be explained below.

Creating a feedstock for 3D printing devices is not an easy feat as there are multiple parameters that should be adjusted. The final feedstock product must in particular meet the flexibility, stiffness, stickiness and viscosity required for successful 3D printing.

In the field of 3D printing the fused deposition modelling (FDM) process is increasingly being used for manufacturing consumer goods, warranting an improvement in the quality of the 3D printed object output.

Fused deposition modelling is an additive manufacturing technology commonly used for modelling, prototyping, and production applications. FDM is a rapid prototyping technique and it is one of mechanical manufacturing technologies, in which the process of extension of feedstock materials is involved. Generally, FDM works by laying down material in layers.

It is known that volumetric flow errors compromise the quality of the printed product. The thermoplastic filament itself has a significant effect on the variability in an FDM extruder's flow.

In other words, depending on its material the feedstock filament contributes to volumetric flow errors.

Furthermore, without wanting to be bound by theory it is believed that in terms of mechanical design, the size and tolerance of the filament diameter is found to play a very significant role in determining flow characteristics of the extruder.

Ideally, the diameter of the filament used can be minimized and a filament can be manufactured with tighter diameter tolerances to reduce volumetric flow errors.

Also, in the development of new feedstock composite materials need to be selected with reasonably good mechanical and thermal properties as well as their capabilities of mixing and surface bonding with binders.

In view of the above, there is a need for new feedstock for 3D printing devices which can be formed into a filament of constant diameter and which also meets the further material requirements such as sufficient hardness, suitable viscosity, good extension properties as well as a good adhesion of the printed mass strands to each other.

The stickiness is at least one property by which a feedstock suitable for 3D printing devices differs from a feedstock that is commonly used in powder injection molding (PIM) or powder extrusion molding (PEM) processes. A feedstock suitable for 3D printing requires good bonding ability of the individual mass strands between each other in order to produce a 3D structure with high resolution and good reproducibility. This property of the feedstock is however not beneficial with powder injection molding (PIM) or powder extrusion molding (PEM), in particular if these applications involve a smoothing calendar, a slit die or similar means. In fact, in PIM or PEM applications such stickiness is rather undesirable, and is generally avoided by preparing a specific feedstock that does not have this property, for example by including anti-adhesion additives.

It was an object of the invention to provide a novel feedstock material suitable for 3D printing devices meeting the above outlined criteria.

SUMMARY

To solve the aforementioned problems, the present invention provides a filament suitable to be used in a 3D printing device, wherein the filament comprises or consists of
(a) a metal (for example aluminum or steel) and/or ceramic powder;
(b) a thermoplastic binder comprising a thermoplastic polymer and at least one plasticizer; and
(c) between 0 and 10 wt % of additives based on the total weight of the filament.

A further aspect of the invention relates to a process for producing a shaped body, the process comprising the following steps:
(i) printing a shaped green body using the filament according to the invention and a 3D-printing device;
(ii) removing at least part of the plasticizer from the shaped green body; and
(iii) sintering the shaped green body obtained from step (ii) to obtain said shaped body.

Also provided is the use of a filament according to the invention in a 3D printing device.

In another aspect, the invention also relates to a green body producible by mixing a metal and/or ceramic powder according to the invention and a thermoplastic binder according to the invention.

Also provided is as a further aspect the use of a binder as defined in the invention for the production of a filament for 3D printing devices.

BRIEF DESCRIPTION OF THE DRAWINGS

FIG. 1 illustrates the testing results of Example 1 for filament aluminum oxide.

FIG. 2 illustrates the testing results of Example 2 for filament stainless steel.

DETAILED DESCRIPTION

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Some documents are cited throughout the text of this specification. Each of the documents cited herein (including all patents, patent applications, scientific publications, manufacturer's specifications, instructions, DIN norms etc.), whether supra or infra, are hereby incorporated by reference in their entirety. Nothing herein is to be construed as an admission that the invention is not entitled to antedate such disclosure by virtue of prior invention.

In the following definitions of some chemical terms are provided. These terms will in each instance of its use in the remainder of the specification have the respectively defined meaning and preferred meanings.

The term "alkyl" refers to a saturated straight or branched carbon chain. Preferably, an alkyl as used herein is a $C_1$-$C_{22}$ alkyl and more preferably is a $C_1$-$C_{10}$ alkyl, i.e. having 1, 2, 3, 4, 5, 6, 7, 8, 9 or 10 carbon atoms, e.g. is selected from methyl, ethyl, propyl, iso-propyl, butyl, iso-butyl, tent-butyl, pentyl or hexyl, heptyl, octyl, nonyl and decyl. Alkyl groups are optionally substituted.

The term "alcohol" refers to a compound having one or more hydroxyl groups. For example a $C_8$-$C_{36}$ alkyl alcohol is a $C_8$-$C_{36}$ alkyl substituted with one or more hydroxyl groups. A fatty alcohol as used herein refers to a linear aliphatic primary alcohol.

The present invention provides novel filaments suitable to be used in a 3D printing device such as a fused deposition modelling device. It was unexpectedly found that the filaments exhibit an ideal combination of viscosity and hardness properties as well as sufficient adhesion when printed.

Thus, in a first aspect the invention provides a filament suitable to be used in a 3D printing device, wherein the filament comprises or consists of (a) a metal (for example aluminum or steel) and/or ceramic powder;

(b) a thermoplastic binder comprising a thermoplastic polymer and at least one plasticizer; and (c) between 0 and 10 wt % of additives based on the total weight of the filament.

Preferably, the filament of the invention comprises at most 8, 6, 4, 2 or at most 1 wt % of additives, based on the total weight of the filament. Preferred amounts of the ingredients of a filament of the invention are listed in the table below, wherein the sum of the listed ingredients is 100 wt %, based on the total weight of the filament:

| Preferred embodiment | metal and/or ceramic powder | thermoplastic polymer | plasticizer 1: ester, solid at 20° C. | plasticizer 2: ester, liquid at 20° C. | additives |
|---|---|---|---|---|---|
| A | 80-95 wt % | 1-10 wt % | 1-5 wt % | 0-5 wt % | 0-1 wt % |
| B | 80-95 wt % | 2-8 wt % | 1-5 wt % | 0-5 wt % | 0-1 wt % |
| C | 80-95 wt % | 2-8 wt % | 3-5 wt % | 0-5 wt % | 0-1 wt % |
| D | 80-95 wt % | 2-8 wt % | 3-5 wt % | 1-4 wt % | 0-1 wt % |
| E | 83-93 wt % | 2.5-8 wt % | 3.5-5 wt % | 1.5-3.5 wt % | 0-1 wt % |
| F | 83-93 wt % | 2.5-8 wt % | 3.5-5 wt % | 1.5-3.5 wt % | 0 wt % |

Depending on the application, it may be a benefit of including a viscosity modifier or a lubricant as additive. If a viscosity modifier is included then it is preferably selected from the group consisting of hydrogenated copolymers of styrene-butadiene, ethylene-propylene copolymers, polyisobutenes, hydrogenated styrene-isoprene polymers, hydrogenated isoprene polymers, polymethacrylates, polyacrylates, polyalkyl styrenes, alkenyl aryl conjugated diene copolymers, polyolefins, esters, functionalized polyolefins, ethylene-propylene copolymers functionalized with the reaction product of maleic anhydride and an amine, polymethacrylate functionalized with an amine, styrene-maleic anhydride copolymers reacted with an amine, polymethacrylate polymers, esterified polymers, esterified polymers of a vinyl aromatic monomer and an unsaturated carboxylic acid or derivative thereof, olefin copolymers, ethylene-propylene copolymer, polyisobutylene or mixtures thereof If as additive a lubricant is to be included then stearic acid can be used for this purpose.

In other applications, no additive is necessary. Thus, it is most preferred that the filament of the invention comprises no additives. This will maximize the amount of metal and/or ceramic powder to be included in the filament which is desirable because it will reduce the volume change of the printed prototype upon sintering. If the filament comprises no additives it is preferred that the filament may nevertheless comprise impurities which are typically found in metal or ceramic powders or in the thermoplastic binder of the invention. It is most preferred that the amount of such impurities does not exceed 0.8 wt % of the total mass of the filament of the invention. It is preferred that a filament of the invention does not comprise any anti-adhesion additives.

It is preferable that in one embodiment the filament comprises between 5 and 25 wt % of the binder based on the total weight of the filament.

Preferably, the filament has a shore A hardness of at least 85 at 20° C.

In the filament according to the invention the metal and/or ceramic powder is preferably sinterable. This means that the metallic or ceramic powder comprised in the printed shape will form a coherent mass upon heating without undergoing melting.

Preferred is a filament of the invention, wherein said thermoplastic polymer is selected from the group consisting of a polyurethane, a polyamide, a polyvinylpyrrolidon, a polyacrylate, a polyolefin and a mixture thereof. Preferably, said thermoplastic polymer is a polyamide selected from the group consisting of a copolyamide, Polyamide 11, Polyamide 12, a polyether-blockamide and mixtures thereof. The copolyamide which can in one embodiment be soluble in alcohol is preferably produced from a C4-C8 lactam and from a C10-C18 lactam. Most preferably said copolyamide is produced from caprolactam and laurinlactam.

It is also preferred that said plasticizer is removable at least in part from the filament by extraction at a temperature of at least 20° C. and preferably of between 20° and 80° C. using an organic solvent.

The at least one plasticizer can preferably be a substituted or non-substituted aromatic or heteroaromatic carboxylic acid ester or mixtures thereof. Preferably, said at least one plasticizer is a mixture of hydroxybenzoic acid esters. If a mixture of hydroxybenzoic acid esters is used in the filament as plasticizer then the hydroxybenzoic acid esters are preferably esters of hydroxybenzoic acid and a branched or linear alcohol, wherein the alcohol is selected from the group consisting of a branched or linear C8-C22 alcohol and mixtures thereof and wherein the alcohol is preferably selected from 2-propyl heptyl alcohol, isodecyl alcohol, 1-docosanol, 1-octadecanol, 1-dodecanol, 2-ethylhexyl alcohol and mixtures thereof.

In a further preferred embodiment, the plasticizer comprises an ester of hydroxybenzoic acid and a linear, primary C8-C22 alcohol.

In a further preferred embodiment of the filament of the invention the hydroxybenzoic acid ester is preferably a p-hydroxybenzoic acid ester. In a more preferred embodiment of the filament, said at least one plasticizer is an ester mixture produced from p-hydroxybenzoic acid and a mixture of alcohols, wherein the alcohol mixture preferably comprises 2-propyl heptyl alcohol, isodecyl alcohol, 1-docosanol, 1-octadecanol, 1-dodecanol and/or 2-ethylhexyl alcohol.

In a preferred embodiment of the filament of the invention said at least one plasticizer is a mixture of esters, wherein the mixture of esters comprises an ester which is solid at 20° C. and an ester that is liquid at 20° C. or comprises only esters that are solid at 20° C. It was unexpectedly found that including such a mixture in the plasticizer allowed the filament of the invention in particular for filaments based on ceramic powders to stay elastic for a longer time, while at the same time providing sufficient bonding capability upon printing (see also example 3 below).

In a further preferred embodiment of the filament, the thermoplastic binder comprises between 40 wt % and 70 wt % of plasticizer based on the total weight of the binder. Preferably, said thermoplastic binder has a melting temperature of between 100° C. and 190° C.

Also preferred is that the filament of the invention is in one embodiment elastic and has a diameter of between 0.5 mm and 5 mm and more preferably between 1 mm and 3 mm. Preferably, the filament is sufficiently elastic such that it can be rolled up on a spool. In a preferred embodiment of the filament of the invention the filament is rolled up on a spool, wherein the spool has a diameter of 400 mm. It is also preferred that the filament of the invention has a length of at least 1 meter and more preferably at least 10 cm. In another preferred embodiment the filament of the invention is linear and suitable for storage in a dispenser magazine.

In a further aspect the invention provides a process for producing a shaped body, the process comprising the following steps:
(i) printing a shaped green body using the filament according to the invention and a 30-printing device;
(ii) removing at least part of the plasticizer from the shaped green body; and
(iii) sintering the shaped green body obtained from step (ii) to obtain said shaped body.

Preferably, in step (ii) of the process according to the invention the plasticizer is extracted by contacting the green body with an organic solvent capable of extracting the plasticizer wherein said extraction does not change the shape of the shaped green body. Different organic solvents can be used in step (ii) including acetone for example.

In a further aspect the invention provides the use of a filament according to any of the invention in a 30 printing device, i.e. to print 30 shapes using such a printing device.

A further aspect of the invention is a green body producible by mixing a metal and/or ceramic powder according to the invention as defined herein and a thermoplastic binder as defined herein. In one preferred embodiment said greenbody is selected from the group consisting of an implant, a filling, a tooth crown and a tooth bridge for use in dental repair after sintering. Also provided is the use of a binder according to the invention as defined herein for the production of a filament for 30 printing devices.

Various modifications and variations of the invention will be apparent to those skilled in the art without departing from the scope of the invention. Although the invention has been described in connection with specific preferred embodiments, it should be understood that the invention as claimed should not be unduly limited to such specific embodiments.

The following examples are merely illustrative of the present invention and should not be construed to limit the scope of the invention as indicated by the appended claims in any way.

EXAMPLES

Example 1: Production of a Steel-Based Filament

An atomized stainless steel powder having an average particle size of about 15 micrometres was mixed in a kneading machine at 130° C. with the following binder components and homogenized for 1 hour to obtain a plastic state of the composition:

|  | Compound | Weight percent |
|---|---|---|
| sinterable powder | stainless steel powder PF 15 (Atmix Corporation, Japan) | 91.30 wt % |
| binder | CoPolyamid PA 6/12 (Caprolactam/Laurinlactam) ORGASOL 3502 (ARKEMA, Frankreich) | 2.90 wt % |

-continued

| Compound | Weight percent |
|---|---|
| 4-hydroxybenzoic acid-behenylester, solid (EMERY Oleochemicals) | 3.80 wt % |
| 4-hydroxybenzoic acid 2-ethylhexylester, liquid (EMERY Oleochemicals) | 2.00 wt % |
| Total | 100 wt % |

The composition outlined in the table above was further ground to into a granular form having granules of about 1 to 3 mm.

Using a single-screw extruder the granules were extruded into a string having a diameter of 2.5 mm using a cylinder temperature of 120° C. and a constant nozzle temperature of 80° C. The filament was then rolled up on a spool with a diameter of 400 mm.

Example 2: Production of Aluminium-Based Filament

An aluminium oxide powder having an average particle size of about 1 micrometre was mixed in a kneading machine at 130° C. with the following binder components and homogenized for 1 hour to obtain a plastic state of the composition:

| | Compound | Weight percent |
|---|---|---|
| sinterable powder | aluminiumoxide powder (ALCOA CT 3000; Alcoa) | 84.0 wt % |
| binder | CoPolyamid PA 6/12 (Caprolactam/Laurinlactam) ORGASOL 3502 (ARKEMA, Frankreich) | 7.5 wt % |
| | binder 4-hydroxybenzoic acid-behenylester (solid, EMERY Oleochemicals GmbH) | 4.6 wt % |
| | 4-hydroxybenzoic acid-2-ethylhexylester (liquid, EMERY Oleochemicals GmbH) | 3.1 wt % |
| additive | stearic acid | 0.8 wt % |
| Total | | 100 wt % |

The composition outlined in the table above was further ground to into a granular form having granules of about 1 to 3 mm.

Using a single-screw extruder the granules were extruded into a string having a diameter of 2.5 mm using a cylinder temperature of 130° C. and a constant nozzle temperature of 75° C. The filament was then rolled up on a spool with a diameter of 400 mm.

Example 3: Measuring Adhesive Properties

To test the bonding capability of filaments to each other, extruded filaments were layered onto each other. At a temperature of 120° C. the filaments melted and adhered superficially to each other without the need to apply any pressure. Samples prepared in this way were extracted for 12 hours in acetone at 40° C., dried and sintered under suitable conditions (steel-based material at 1360° C. in a hydrogen atmosphere and aluminum oxide-based material at 1620° C. in air). The sinter density was greater than 95% of the theoretically achievable value.

At a temperature of 120° C. to 170° C. the adhesive properties of the filaments showed optimal stickiness to each other to allow bonding of the filaments and subsequent removal of the plasticizer without compromising the structural stability of the bonded filaments. It is therefore preferred that in a filament of the invention the melting temperature of the inventive thermoplastic binder is between 120° C. and 170° C.

Example 4: Determining Shore A Hardness

If the binder in the filament is too soft, the transport device of a typical 30 printer will not be able to effectively transport the filament to the printing head with sufficient power. Conversely, if the binder is too hard, this will cause filaments and in particular ceramic-based filaments having very fine ceramic particles to become too brittle which is inconvenient for handling and also may result in breakage of the filament during printing.

The composition of the filament as claimed was therefore optimized also with regard to its Shore A hardness. In this context, the Shore A hardness of the binder composition of the invention as outlined in the tables shown above under examples 1 and 2 have been measured according to DIN ISO 7619-1 standard using a HPE II hardness tester.

The measurement carried out at 20° C. gave for the binder shown in example 1 a Shore A hardness value of 94.5 and for the binder shown in example 2 a Shore A hardness value of 89.7. Thus, a preferred Shore A hardness value for the binder comprised in a filament of the invention is between 85 and 95. Unexpectedly, selecting the Shore A hardness to be within this range showed that the final filament had an optimal balance between softness and elasticity.

Filament compositions having a Shore A hardness that was outside this range, will be inferior in that the filament will be either brittle or not dense enough which causes shrinkage problems upon sintering.

Example 5: Determining Melt Flow Index (MFI) Values for The Filaments

The melt flow index (MFI) is a measure of the ease of flow of the melt of a thermoplastic material. It is defined as the mass of material, in grams, flowing in ten minutes through a capillary of a specific diameter and length by a pressure applied via prescribed alternative gravimetric weights for alternative prescribed temperatures.

The MFI values for the filaments prepared according to example 1 and example 2 have been determined according to standard ISO 1133 using an MFlow testing device.

The results are shown in FIGS. 1 and 2 below. The determined flow values showed that the inventive filaments are particularly suitable for 3D printing devices.

Example 6: Results

New composite materials as outlined above under example 1 and 2 have been successfully developed for use as a filament feedstock in Fused Deposition Modelling rapid prototyping processes. The flexible filaments of the invention have been successfully produced. They could be rolled on a spindle and could be bonded very well at a suitable temperature, for example at 120° C. A matelial characterization of the novel filaments has been carried out. Analysis of the mechanical test values and MFI values for the feedstock materials show the suitability of the feedstock for use in a 3D printing system such as a FDM system. Furthermore, they exhibit an excellent bonding between layers and will therefore also have a good build platform adhesion property.

The invention claimed is:

1. A 3D printing system comprising a filament, wherein the filament comprises
   (a) a metal and/or ceramic powder;
   (b) a thermoplastic binder comprising a thermoplastic polymer and at least one plasticizer; and
   (c) from 0 to 10 wt % of additives based on the total weight of the filament,
   wherein the at least one plasticizer is a mixture of esters, and wherein the mixture of esters comprises an ester which is solid at 20° C. and an ester that is liquid at 20° C., and
   wherein the filament has a Shore A hardness of at least 85 at 20° C.

2. The 3D printing system according to claim 1, wherein the metal and/or ceramic powder is sinterable.

3. The 3D printing system according to claim 1, wherein the thermoplastic polymer is selected from the group consisting of a polyurethane, a polyamide, a polyvinylpyrrolidon, a polyacrylate, a polyolefin, and mixtures thereof.

4. The 3D printing system according to claim 3, wherein the thermoplastic polymer is a polyamide, wherein the polyamide is selected from the group consisting of a copolyamide, Polyamide 11, Polyamide 12, a polyether-blockamide, and mixtures thereof.

5. The 3D printing system according to claim 1, wherein the plasticizer is removable at least in part from the filament by extraction at a temperature of at least 20° C. using an organic solvent.

6. The 3D printing system according to claim 1, wherein the at least one plasticizer is a substituted carboxylic acid ester, a non-substituted aromatic carboxylic acid ester, a heteroaromatic carboxylic acid ester, or mixtures thereof.

7. The 3D printing system according to claim 1, wherein said at least one plasticizer is a mixture of hydroxybenzoic acid esters.

8. The 3D printing system according to claim 7, wherein the hydroxybenzoic acid esters are esters of hydroxybenzoic acid and a branched or linear alcohol, wherein the alcohol is selected from the group consisting of a branched C8-C22 alcohol, a linear C8-C22 alcohol, and mixtures thereof.

9. The 3D printing system according to claim 7, wherein the hydroxybenzoic acid esters are a p-hydroxybenzoic acid esters.

10. The 3D printing system according to claim 1, wherein the thermoplastic binder comprises between 40 wt % and 70 wt % of the at least one plasticizer based on the total weight of the binder.

11. The 3D printing system according to claim 1, wherein the thermoplastic binder has a melting temperature of between 100° C. and 190° C.

12. The 3D printing system according to claim 1, wherein the filament is elastic, has a diameter of between 0.5 mm and 5 mm, and has a length of at least 10 cm.

13. The 3D printing device according to claim 1, wherein the filament comprises
   (a) from 80 to 95 wt % of the metal and/or ceramic powder based on the total weight of the filament of
   (b) from 2 to 8 wt % of the thermoplastic polymer based on the total weight of the filament and from 1 to 5 wt % of the at least one plasticizer based on the total weight of the filament, and (c) from 0 to 1 wt % of additives based on the total weight of the filament, wherein the sum of the listed ingredients is 100 wt %, based on the total weight of the filament.

14. The 3D printing system according to claim 1, wherein the Shore A hardness is measured in accordance to DIN ISO 7619-1 standard using a HPEII hardness tester.

* * * * *